United States Patent [19]

Mesher

[11] Patent Number: 6,039,865
[45] Date of Patent: Mar. 21, 2000

[54] REMOVAL OF PHOSPHATES FROM HYDROCARBON STREAMS

[75] Inventor: Shaun T. E. Mesher, Calgary, Canada

[73] Assignee: Trisol Inc., Calgary, Canada

[21] Appl. No.: 09/191,750

[22] Filed: Nov. 13, 1998

[30] Foreign Application Priority Data

Dec. 19, 1997 [CA] Canada ................................. 2225297
Nov. 3, 1998 [CA] Canada ................................. 2252686

[51] Int. Cl.$^7$ .................... C10G 45/00; C10G 19/00; C10G 29/04; C07G 7/12; C04B 35/03
[52] U.S. Cl. .................... 208/263; 208/283; 208/284; 208/295; 208/297; 585/820; 585/823; 585/824; 501/89; 501/108; 501/109; 501/118; 501/123; 501/125
[58] Field of Search ............... 501/89, 108, 109, 501/118, 123, 125; 208/263, 283, 284, 295, 297; 585/820, 823, 824

[56] References Cited

U.S. PATENT DOCUMENTS

| | | | |
|---|---|---|---|
| 2,494,310 | 1/1950 | Pleuddemann | 202/57 |
| 3,457,165 | 7/1969 | Urban | 208/263 |
| 3,761,534 | 9/1973 | Sun et al. | 260/674 A |
| 5,252,254 | 10/1993 | Babaian-Kibala | 252/393 |
| 5,389,240 | 2/1995 | Gillespie et al. | 208/226 |
| 5,500,107 | 3/1996 | Edmondson | 208/47 |

OTHER PUBLICATIONS

Advanced Organic Chemistry, Reactions, Mechanisms, and Structure, Third Edition, Jerry March, pp. 507–565.

Synthesis of Alkyl Dihydrogenphosphate by the Reaction of Alcohols and Silyl Polyphosphate, Yoshiki Okamoto, 1985 The Chemical Society of Japan, pp. 3393–3394.

A Survey of Ceramic Raw Materials, Robert R.H. Robertson, Scotland, pp. 77–83, Edited by Stewart, Academic Press, 1962.

Product and Process Integration: The Need for a Ceramics Manufacturing Science, Richard L. Pober, 1989, High–Tech Ceramics: Viewpoints and Perspectives ISBN 0–12–421950–0, pp. 17–23.

Production of Powders for High–tech Ceramics, James A. Dirksen and Terry A. Ring, 1989, High–Tech Ceramics: Viewpoints and Perspectives ISBN 0–12–421950–0, pp. 29–33.

Processing and Properties of Advanced Structural Ceramics, Ludwig J. Gauckler, 1989, High–Tech Ceramics: Viewpoints and Perspectives ISBN 0–12–421950–0, pp. 59–65.

Engineering Applications of Ceramics, Ulf Dworak, 1989, High–Tech Ceramics: Viewpoints and Perspectives ISBN 0–12–421950–0, pp. 107–109.

*Primary Examiner*—Walter D. Griffin
*Assistant Examiner*—Tam M Nguyen
*Attorney, Agent, or Firm*—Christensen O'Connor Johnson & Kindness PLLC

[57] ABSTRACT

Phosphates can be removed from a hydrocarbon stream by contacting said stream with a ceramic formed of a basic material which is insoluble in the hydrocarbon stream. A ceramic as used in this patent document is a solid solution formed by calcination of a compound. The removal of the organic acid is accomplished at temperatures ranging from 20° C. to 400° C., a preferred temperature is between 200° C. and 370° C. A hydrocarbon stream consists of $C_5+$ hydrocarbons. The basic material can be made up of one or more alkaline earth oxides, alkaline earth compounds, alkaline metal compounds, group IIIA element compounds, group IVA element compounds, group VIA element compounds. Preferred alkaline earth oxides are sodium, magnesium, potassium, calcium, aluminum and silicon. The support for the basic material can be made from any inorganic oxide. A preferred composition is a combination of two or more alkaline earth oxides blended with an inorganic oxide support and calcined to form a ceramic material. The ceramic material should contain a large surface area and pore size to allow efficient removal of the organic acids. For example, the surface area should be at least over 50 $m^2/g$, and the higher the better. The ceramic material should be placed in a hot hydrocarbon stream to facilitate the destruction and removal of organic acids within the stream. Application of the process to acids is also described.

6 Claims, 1 Drawing Sheet

REMOVAL OF PHOSPHATES FROM HYDROCARBON STREAMS

FIELD OF THE INVENTION

This invention relates to the removal of phosphates from hydrocarbon streams.

BACKGROUND OF THE INVENTION

In the treatment of oil and gas wells by fracturing, a frac fluid is applied to an underground formation under sufficient pressure to form fractures in the formation, and thus improve flow of oil and gas from the formation into a well. It is desirable to retain the frac fluid close to the well bore and for this reason the frac fluids are made as gels and then pumped into the ground. The chemicals used to gel the frac fluids contain considerable phosphate and metal concentration. Upon completion of the fracturing treatment, pressure is released, the frac fluid breaks and the broken frac fluid is produced from the well along with reservoir fluid.

When the well is produced, the well production fluid is delivered to a refinery for refining into various hydrocarbon fluids. In the refining process, the phosphates have been found to cause contamination and plugging of the refinery equipment. It has thus been found necessary either to remove the phosphates from the chemicals used to gel the frac fluid or remove them in the refinery itself. Customers of Trysol Canada Ltd. have requested a solution to the problem of removing phosphates from hydrocarbon streams. So far as the applicant is aware, the producers of the hydrocarbons have been unable to provide a satisfactory solution.

SUMMARY OF THE INVENTION

The inventor has thus addressed the need for removing phosphates from a hydrocarbon stream, particularly a broken frac fluid.

Phosphates are removed from a hydrocarbon stream by contacting the hydrocarbon stream with a ceramic formed from a basic material selected from the group consisting of alkaline earth oxides, alkaline earth compounds, alkaline metal compounds, group IIIA element compounds, group IVA element compounds and group VIA element compounds, wherein the ceramic chemically reacts with phosphates in the hydrocarbon stream and binds to the phosphates, thus removing them from the hydrocarbon stream.

Contacting the hydrocarbon stream with the ceramic preferably, particularly for large volume applications at a refinery, may comprise distilling the hydrocarbon stream in a tower packed with ceramic bricks, wherein the hydrocarbon stream is separated from the polar material upon passage through the ceramic bricks. Preferably, the ceramic bricks are randomnly packed.

The method is preferably carried out at a temperature, for example greater than 260 degrees C., that promotes decomposition of phosphates absorbed onto the ceramic bricks.

A method for removing acids from a hydrocarbon stream comprising contacting the hydrocarbon stream with the ceramic bricks.

Apparatus for removing a polar material from a hydrocarbon stream preferably comprises a tower packed, at least filling a portion of the length of the tower, with ceramic bricks made from a basic material selected from the group consisting of alkaline earth oxides, alkaline earth compounds, alkaline metal compounds, group IIIA element compounds, group IVA element compounds and group VIA element compounds.

These and other aspects of the invention are described in the detailed description of the invention and claimed in the claims that follow.

BRIEF DESCRIPTION OF THE FIGURES

There will now be described preferred embodiments of the invention with reference to the figure, by way of example and without intending to limit the scope of the invention as defined by the claims, in which:

DETAILED DESCRIPTION OF PREFERRED EMBODIMENTS OF THE INVENTION

Phosphates can be removed from a hydrocarbon stream by contacting said stream with a ceramic formed of a basic material which is insoluble in the hydrocarbon stream. A ceramic as used in this patent document is a solid solution formed by calcination of a compound. Polar material as used in this patent document means an acid or phosphate. The removal of the phosphate is accomplished at temperatures ranging from 20° C. to 400° C., a preferred temperature is between 200° C. and 370° C. It is believed that the process is not significantly affected by pressure. A hydrocarbon stream consists of $C_5+$ hydrocarbons. The basic material can be made up of one or more alkaline earth oxides, alkaline earth compounds, alkaline metal compounds, group IIIA element compounds, group IVA element compounds, group VIA element compounds. Preferred alkaline earth oxides are oxides of sodium, magnesium, potassium, calcium, aluminum and silicon. The support for the basic material can be made from any inorganic oxide. A preferred composition is a combination of two or more alkaline earth oxides blended with an inorganic oxide support and calcined to form a ceramic material. The ceramic material should contain a large surface area, pore size and mechanical strength to allow efficient removal of the phosphates and organic acids. For example, the surface area should be at least over 50 $m^2/g$, and the higher the better, without compromising the strength of the material. The ceramic material should be placed in a hot hydrocarbon stream to facilitate the destruction and removal of phosphates and organic acids within the stream.

Exemplary inorganic oxide supports are Al, Si, Zr, Ti. Exemplary basic materials are magnesium, calcium and aluminum since these are inexpensive and readily available. An exemplary material comprises a solid solution of calcined magnesium-calcium-aluminum aluminum oxide, wherein the magnesium is 5% by weight, calcium is 5% by weight and aluminum is 90% by weight of the metal component. A further exemplary material comprises a solid solution of calcined magnesium-calcium-aluminum oxide, wherein the magnesium is 25% by weight, calcium is 25% by weight and aluminum is 50% by weight of the metal component. The ceramic may include fired metal oxide, eg $Al_2O_3$, $Cr_2O_3$, MgO, $SiO_2$, $ZrO_2$, $UO_2$, a fired carbide, eg SiC, TiC, WC, $Cr_3C_2$, a fired boride, eg $Cr_3B_2$, $TiB_2$, $ZrB_2$, a silicide eg $MoSi_2$, or a nitride, eg TiN. The ceramics are prepared in conventional manner, and may be obtained for example from Norton Chemical Process Products Company of Akron, Ohio.

Figure 1:
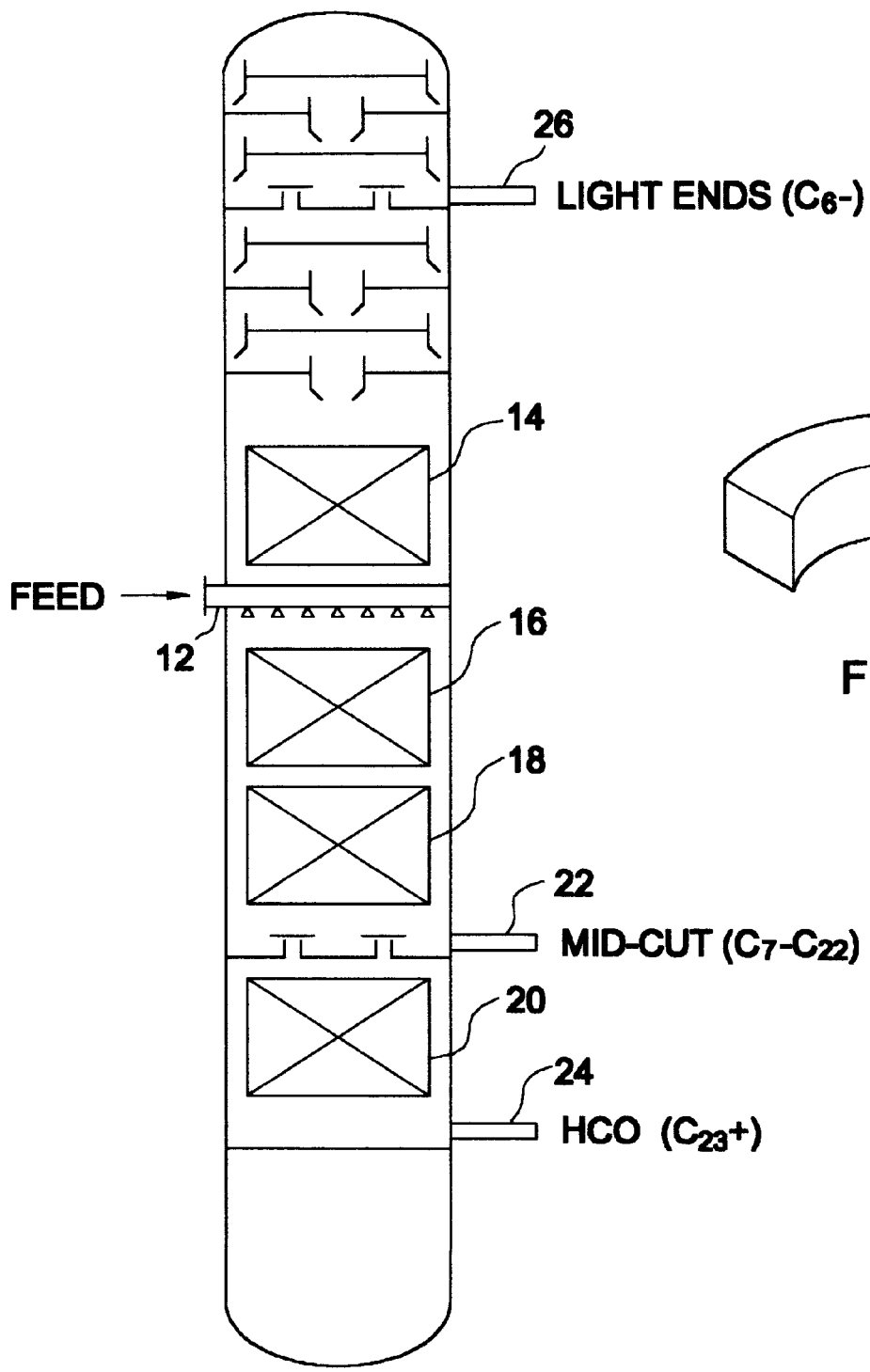
FIG. 1 shows a section through a tower packed with ceramic according to the invention.

Preferably, the method is carried out within a fractionation tower 10 as illustrated in FIG. 1. Fractionation tower 10 is located in a refinery (not shown). Preferably, the process is carried out at an early stage of the refining process, and may be applied to a crude feed. Care must be taken in the case of dirty crude feeds that the crude is not so contaminated that the pores in the ceramic will be filled with contaminants. Dirty crudes should be treated to clean them up before being fed to the tower 10. The feed enters tower 10 through line 12 in conventional manner. Heat is applied to the tower in conventional manner. Ceramic packing 14, 16, 18 and 20 fills portions of the tower as shown above and below the feed line 12. The ceramic packing is supported within the tower 10 in conventional manner as for example on steel seives or trays. It is meant by "filling a portion of the tower" that the packing extends completely across the tower so that any fluid passing from the feed line 12 to one of the outlet lines must pass across the packing. A mid-cut is taken at line 22, heavy cycle oil is taken at line 24 and light ends are removed from the tower 10 at line 26. The tower diameter will depend on the flow rate of the hydrocarbon stream. A tower that is completely filled with randomnly packed ceramic bricks is also acceptable, providing sufficient permeability is left to allow movement of product through the tower.

Figure 2:
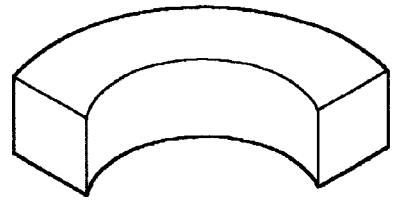
FIG. 2 shows an exemplary ceramic brick in accordance with the invention.

The ceramic packing is preferably formed from a ⅛ inch extruded ceramic brick 28 as shown for example in FIG. 2. This extrudate is preferably randomly packed within the packing. Various shapes of extrudate may be used that promote random packing. The random packing of fine ceramic material supplies surface area for efficient distillation and removal of phosphate and organic acids by trapping and thermal decomposition. Since the phosphates bind to the ceramic bricks, as the ceramic bricks become saturated with phosphate, the ceramic bricks should be removed and burnt to remove the phosphate.

The removal of phosphate is based on the basic principal of a two phase physical interaction between the phosphate and the basic inorganic material. The phosphate will bind to the basic material and become trapped within the ceramic matrix. In this case the ceramic material acts like a trap and holds the phosphate. With the addition of heat this trapping mechanism increases. In addition, some phosphates thermally decompose and the by-products if not trapped by the basic ceramic material could cause problems with corrosion and fouling within the plant. Unsaturated and saturated carboxylic acids in the hydrocarbon stream are harder to decompose but are also trapped within a basic material. Once bonded to the material they are more likely to decompose with the addition of energy to the system.

The function of the basic ceramic material is two fold. It provides surface area to collect and trap the phosphate. It provides a catalytic medium in which phosphates and organic acids can thermally decompose. Decomposition may be advantageous in the case of acids because the organic moiety of the acid would be expelled from the basic ceramic material and the inorganic portion of the acid would be trapped, lengthening the lifetime of the basic ceramic material.

Thermal decarboxylation and dephosphorylation can occur by a number of possible mechanisms. Reactivity of the reaction for acids increases once the acid compound is converted to the acid salt. In the form of the acid salt, the acid becomes non-volatile and is more likely to be affected by thermal decomposition.

Possible mechanisms for removal of acids and phosphates are described below. While this is a plausible reaction pathway the inventor is not bound by this proposal.

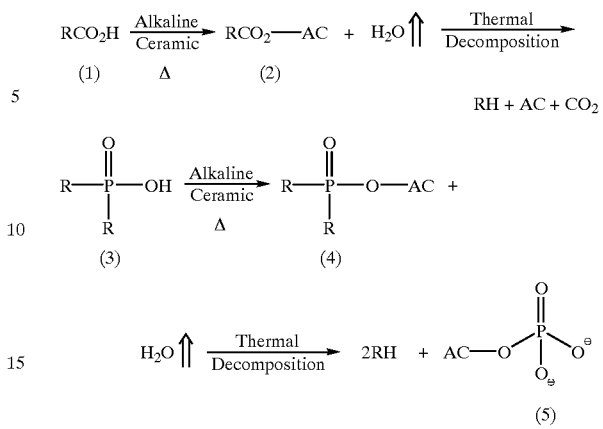

An acid 1 or 3 when in contact with the alkaline ceramic (AC) will form an acid salt 2 and 4 releasing water. Once bound to the surface of the ceramic, the acid can do a number of things: 1) It can remain trapped on the surface. 2) Aromatic and unsaturated acids bound to the surface would easily decompose to give carbon dioxide and a hydrocarbon. 3) Phosphates bound to the surface would likely undergo beta elimination and lose the hydrocarbon groups attached to the phosphorus. The remaining phosphoric acid would then continue to bind phosphates eventually forming a polyphosphoric acid.

Analysis for phosphates was done by ICP with identification of the phosphorus element. Carboxylic acids were analyzed by titration with KOH via ASTM method D664.

EXAMPLES

1. A light crude oil containing 78 ppm phosphates was distilled to a maximum temperature of 370° C. The distillate 90% by volume contained 19 ppm phosphates. The residue 10% by volume contained 26 ppm phosphates.

2. A light crude oil containing 78 ppm phosphates was distilled over 4% sodium carbonate to a maximum temperature of 370° C. The distillate 90% by volume contained 0 ppm phosphates. The residue 10% by volume contained 0 ppm phosphates.

3. A light crude oil containing 78 ppm phosphates was distilled over 4% HTC™ to a maximum temperature of 370° C. The distillate 90% by volume contained 0 ppm phosphates. The residue 10% by volume contained 0 ppm phosphates.

4. A light crude oil containing 78 ppm phosphates was distilled over 33% HTC™ to a maximum temperature of 370° C. The distillate 90% by volume contained 0 ppm phosphates. The residue 10% by volume contained 0 ppm phosphates.

5. A light crude oil containing 18 ppm phosphates was distilled over used (x1) 4% HTC™ to a maximum temperature of 370° C. The distillate 90% by volume contained 0 ppm phosphates. The residue 10% by volume contained 1 ppm phosphates.

6. A light crude oil containing 360 ppm phosphates was distilled over 4% HTC™ to a maximum temperature of 370° C. The distillate 90% by volume contained 11 ppm phosphates. The residue 10% by volume contained 6 ppm phosphates.

7. A light crude oil containing 6400 ppm phosphorus added in the form of tridecylphosphate (16.28 g, 31 mmol)

was distilled over 4% HTC™ to a maximum temperature of 370° C. The distillate 90% by volume contained 101 ppm phosphates. The residue 10% by volume contained 1000 ppm phosphates.

8. A light crude oil containing 78 ppm phosphates was distilled over 4% Ty-Pac™ to a maximum temperature of 370° C. The distillate 90% by volume contained 25 ppm phosphates. The residue 10% by volume contained 99 ppm phosphates.

9. A light crude oil containing 78 ppm phosphates was distilled over 4% sample #9845479 to a maximum temperature of 370° C. The distillate 90% by volume contained 0 ppm phosphates. The residue 10% by volume contained 3.9 ppm phosphates.

10. A light crude oil containing 78 ppm phosphates was distilled over 4% sample #9845478 to a maximum temperature of 370° C. The distillate 90% by volume contained 0.3 ppm phosphates. The residue 10% by volume contained 0.5 ppm phosphates.

11. A light crude oil containing 78 ppm phosphates, naphthoic acid (39 mg, 270 ppm) and octanoic acid (61.7 mg, 428 ppm) was distilled over 4% sample #9845479 to a maximum temperature of 370° C. The distillate 90% by volume contained 0 ppm in acids by titration with KOH. The residue 10% by volume contained 0 ppm in acids by titration with KOH.

In a further experiment, Vermillion condensate (from Vermillion, Alberta, Canada) was passed through two consecutive columns. This Vermillion condensate was a stabilized condensate (FRACSOL™ condensate available from Trysol Canada Limited of Calgary, Alberta, Canada) which had been used in well servicing and thus was contaminated with crude oil. The first column (½") was filled with glass beads, while the second column (¼") was filled with 2.77 g of crushed TyPac 2 pellets. The flow rate was set at 0.9 mL/min to obtain a residence time of 5 minutes (space velocity=11.8 $h^{-1}$). Temperature was 302 degrees C. The sample was washed with NaOH and separated easily from the NaOH. After each of 1, 2, 4 and 6 hours, 0 ppm phosphate remained in the sample. An attempt to run the process at a flow rate of 4.6 mL/min, residence time of 1 minute, did not work due to too great a pressure drop across the column.

From the result of experiment 11, the ceramic bricks herein described are believed to be effective in removing acid from hydrocarbons streams, including crude streams. where the crude contains acid in an amount not more than about 1 acid number.

CHEMICALS

Sodium carbonate was supplied by Sigma-Aldrich Ltd.
HTC™ was supplied by Alcoa Alumina & Chemicals.
Ty-Pac™, sample #9845478 and 9845479 were supplied by Norton Chemical Process Products Corporation.

Immaterial modifications may be made to the invention described herein without departing from the spirit of the invention.

I claim:

1. A method for removing phosphates from a hydrocarbon stream, the method comprising the step of contacting the hydrocarbon stream with a ceramic formed from a basic material selected from the group consisting of alkaline earth compounds, alkaline metal compounds, group IIA element compounds, group IVA element compounds and group VIA element compounds, wherein the ceramic chemically reacts with phosphates in the hydrocarbon stream and binds to the phosphates, thus removing them from the hydrocarbon stream.

2. The method of claim 1 in which contacting the hydrocarbon stream with the ceramic comprises distilling the hydrocarbon stream in a tower packed with ceramic bricks over at least a portion of the length of the tower, wherein the hydrocarbon stream is separated from the phosphate upon passage through the ceramic bricks.

3. The method of claim 2 in which the ceramic bricks are randomly packed.

4. The method of claim 2 in which the method is carried out at a temperature that promotes decomposition of phosphates absorbed onto the ceramic bricks.

5. The method of claim 1 in which the ceramic is made from a basic material selected from the group consisting of aluminum, calcium and magnesium.

6. A method for removing phosphates from a hydrocarbon stream, the method comprising the step of contacting the hydrocarbon stream with a ceramic formed from a basic material comprising an alkaline earth oxide, wherein the ceramic chemically reacts with phosphates in the hydrocarbon stream and binds to the phosphates, thus removing them from the hydrocarbon stream.

* * * * *

UNITED STATES PATENT AND TRADEMARK OFFICE
CERTIFICATE OF CORRECTION

PATENT NO. : 6,039, 865
DATED : March 21, 2000
INVENTOR(S) : S.T.E Mesher

It is certified that error appears in the above-identified patent and that said Letters Patent is hereby corrected as shown below:

| COLUMN | LINE | ERROR |
|---|---|---|
| [73] | Assignee | "Trisol Inc., Calgary, Canada" should read --Trysol Limited, Calgary, Canada-- |
| [56] Pg, 1,col. 1 | Refs. Cited (U.S. Patents) | after patent No, 3,761,534 insert the following reference: --3,930,988  1/1976  Johnson  208/182-- |

Signed and Sealed this

Fifth Day of June, 2001

Attest:

NICHOLAS P. GODICI

Attesting Officer

Acting Director of the United States Patent and Trademark Office